(12) United States Patent
Barker et al.

(10) Patent No.: US 10,205,168 B2
(45) Date of Patent: Feb. 12, 2019

(54) SODIUM TRANSITION METAL SILICATES

(71) Applicants: FARADION LIMITED, Sheffield, South Yorkshire (GB); SHARP CORPORATION, Osaka (JP)

(72) Inventors: Jeremy Barker, Chipping Norton (GB); Emma Kendrick, Oxford (GB); Chaou Choak Tan, Sheffield (GB); Joshua Charles Treacher, Oxford (GB)

(73) Assignees: FARADION LIMITED, Sheffield (GB); SHARP CORPORATION, Osaka (JP)

( * ) Notice: Subject to any disclaimer, the term of this patent is extended or adjusted under 35 U.S.C. 154(b) by 0 days.

(21) Appl. No.: 15/313,300

(22) PCT Filed: May 22, 2015

(86) PCT No.: PCT/GB2015/051514
§ 371 (c)(1),
(2) Date: Nov. 22, 2016

(87) PCT Pub. No.: WO2015/177567
PCT Pub. Date: Nov. 26, 2015

(65) Prior Publication Data
US 2017/0155150 A1    Jun. 1, 2017

(30) Foreign Application Priority Data
May 22, 2014 (GB) .................................. 1409154.0

(51) Int. Cl.
*H01M 4/58* (2010.01)
*H01M 4/136* (2010.01)
(Continued)

(52) U.S. Cl.
CPC ............ *H01M 4/5825* (2013.01); *C01B 33/20* (2013.01); *C01B 33/32* (2013.01); *H01M 4/136* (2013.01);
(Continued)

(58) Field of Classification Search
CPC ......... C01B 33/24; H01M 4/136; H01M 4/04; B01D 53/944
(Continued)

(56) References Cited

U.S. PATENT DOCUMENTS 4,166,159 A    8/1979  Pober
6,872,492 B2   3/2005  Barker et al.
(Continued)

FOREIGN PATENT DOCUMENTS

JP    2008-218303    *  9/2008  .............. H01M 4/04
JP    2008218303 A      9/2008
(Continued)

OTHER PUBLICATIONS

Brochu, F. et al. (2010). Characterization of Na-based electrodes for electrochemical cells. The 15th International Meeting on Lithium Batteries—IMLB 2010. The Electrochemical Society, 469.
(Continued)

*Primary Examiner* — Khanh T Nguyen
(74) *Attorney, Agent, or Firm* — Meunier Carlin & Curfman LLC

(57) ABSTRACT

The present invention is directed to an electrode comprising one or more sodium-containing transition metal silicate compounds of the formula: $A_a M^1{}_b M^2{}_c X_d O_e$ wherein A comprises sodium or a mixture of sodium with lithium and/or potassium $M^1$ comprises one or more transition metals, wherein $M^1$ is capable of undergoing oxidation to a higher oxidation state, $M^2$ comprises one or more non transition metals and/or metalloids, X comprises at least 40 mol % silicon, a is $>0$, b is $>0$ c is $\geq 0$, d is $\geq 1$, e is $\geq 2$, wherein the values of a, b, c, d, and e are selected to maintain the
(Continued)

electroneutrality of the compound; and further wherein the one or more sodium-containing transition metal silicate compounds does not include $Na_2MnSiO_4$.

13 Claims, 20 Drawing Sheets

(51) Int. Cl.
  *H01M 10/052* (2010.01)
  *H01M 10/054* (2010.01)
  *C01B 33/20* (2006.01)
  *C01B 33/32* (2006.01)
  *H01M 10/0525* (2010.01)

(52) U.S. Cl.
  CPC ....... *H01M 10/052* (2013.01); *H01M 10/054* (2013.01); *H01M 10/0525* (2013.01); *C01P 2002/72* (2013.01); *C01P 2006/40* (2013.01)

(58) Field of Classification Search
  USPC .......................................... 429/217
  See application file for complete search history.

(56) References Cited

U.S. PATENT DOCUMENTS

| | | | |
|---|---|---|---|
| 9,586,193 | B2 * | 3/2017 | Fu .................. B01D 53/944 |
| 2003/0170542 | A1 | 9/2003 | Barker et al. |
| 2012/0227252 | A1 | 9/2012 | Nazri |
| 2013/0052544 | A1 | 2/2013 | Ohkubo et al. |
| 2015/0228965 | A1 * | 8/2015 | Ushiroda ............ C01B 33/24 429/217 |

FOREIGN PATENT DOCUMENTS

| | | | |
|---|---|---|---|
| JP | 2013067543 | A | 4/2013 |
| JP | 2013178885 | A | 9/2013 |
| JP | 2013196978 | A | 9/2013 |
| WO | 2010066439 | A2 | 6/2010 |
| WO | 2011162348 | A1 | 12/2011 |
| WO | 2012004839 | A1 | 1/2012 |
| WO | 2012057340 | A1 | 5/2012 |
| WO | 2013035633 | A1 | 3/2013 |
| WO | 2014050086 | A1 | 4/2014 |

OTHER PUBLICATIONS

Dominko, R., Bele, M., Kokalj, A., Gaberscek, M., & Jamnik, J. (2007). Li 2 MnSiO 4 as a potential Li-battery cathode material. Journal of Power Sources, 174(2), 457-461.

Frostäng, S., & Werner, P. E. (1989). Rietveld profile refinement of the sodium ion conductors Na1. 8 [Ga0. 2Zn0. 8] SiO4 and Na1. 8 [Ga0. 2Zn0. 8] GeO4. Materials research bulletin, 24(7), 833-843.

Gong, Z. L., Li, Y. X., He, G. N., Li, J., & Yang, Y. (2008). Nanostructured Li2FeSiO4 electrode material synthesized through hydrothermal-assisted sol-gel process. Electrochemical and Solid-State Letters, 11(5), A60-A63.

Grins, J. (1982). Ionic conductivity of sodium zinc silicates in the compositional region Na2ZnSiO4—Na2ZnSi2O6. Solid State Ionics, 7(2), 157-164.

Grins, J. (1986). Ionic conductivities in compounds based on chemical substitutions in Na 2 ZnSiO 4. Solid State Ionics, 18, 577-581.

International Search Report and Written Opinion of the International Searching Authority, Application No. PCT/GB2015/051514, dated Aug. 3, 2015, 13 pages.

Islam, M. S., Dominko, R., Masquelier, C., Sirisopanaporn, C., Armstrong, A. R., & Bruce, P. G. (2011). Silicate cathodes for lithium batteries: alternatives to phosphates?. Journal of Materials Chemistry, 21(27), 9811-9818.

Lyness, C., Delobel, B., Armstrong, A. R., & Bruce, P. G. (2007). The lithium intercalation compound Li 2 CoSiO 4 and its behaviour as a positive electrode for lithium batteries. Chemical Communications, (46), 4890-4892.

Nytén, A., Abouimrane, A., Armand, M., Gustafsson, T., & Thomas, J. O. (2005). Electrochemical performance of Li 2 FeSiO 4 as a new Li-battery cathode material. Electrochemistry communications, 7(2), 156-160.

Ramesh, T.N. (2012). Sodium Based Cathode Materials or Energy Storage Devices. In Collection of Lectures on Discovery and Applications of Innovative Materials, edited by K.M. Kaveriappa and S.C. Sharma. Karnataka State Higher Education Council, Bengaluru, India, p. 20-36.

Search Report of the GB Intellectual Property Office, Application No. GB1409154.0, dated Dec. 18, 2014, 7 pages.

Zhang, S., Deng, C., & Yang, S. (2009). Preparation of nano-Li2FeSiO4 as cathode material for lithium-ion batteries. Electrochemical and Solid-State Letters, 12(7), A136-A139.

Zhang, P., Li, X. D., Yu, S., Wu, S. Q., Zhu, Z. Z., & Yang, Y. (2013). Effects of Na Substitution on Li Ion Migration in Li2CoSiO4 Cathode Material. Journal of the Electrochemical Society, 160(4), A658-A661.

International Preliminary Report on Patentability issued by the International Bureau of WIPO, Application No. PCT/GB2015/051514, dated Nov. 22, 2016, 8 pages.

* cited by examiner

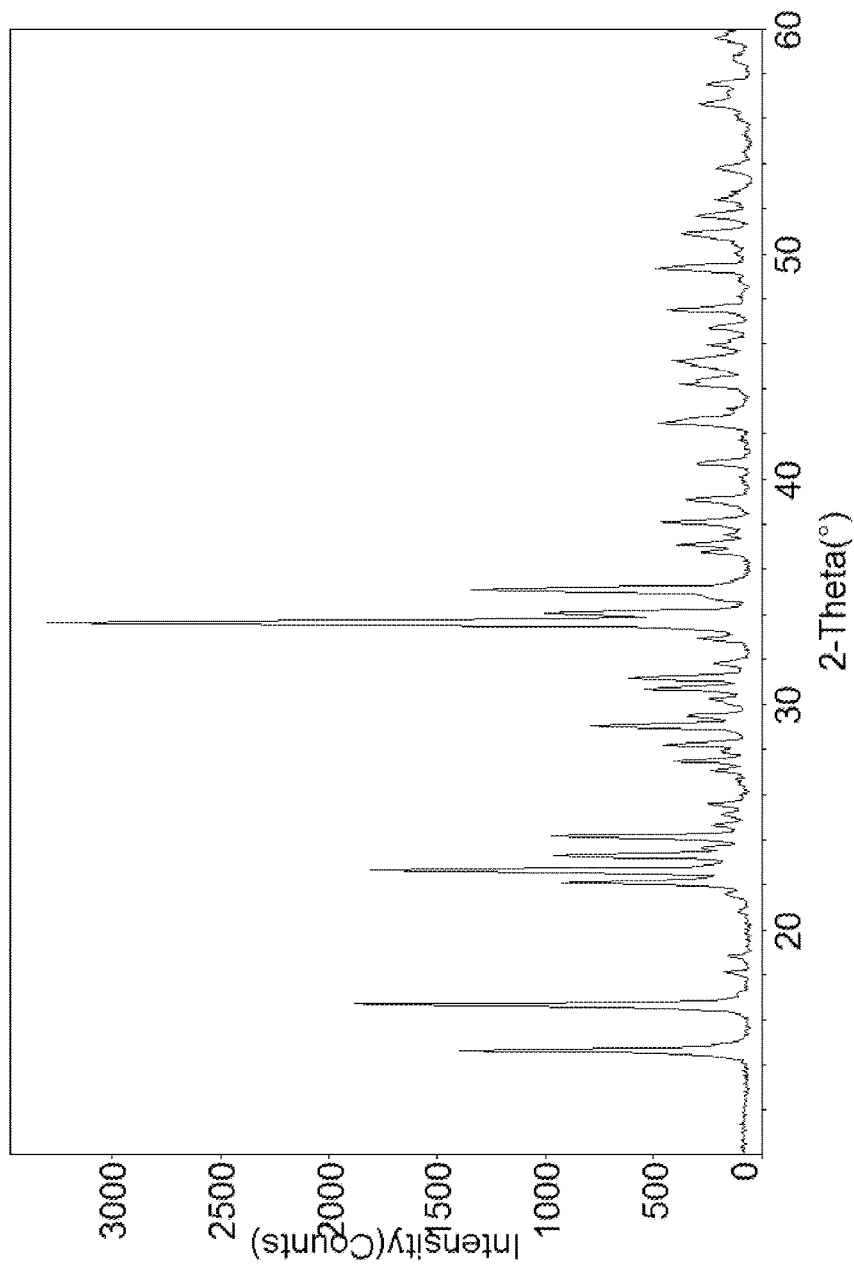

SODIUM TRANSITION METAL SILICATES

TECHNICAL FIELD

The present invention relates to electrodes, particularly cathodes, that contain an active material comprising certain sodium-containing transition metal silicate compounds, and to the use of such electrodes, for example in sodium ion battery applications or other electrical energy storage devices.

BACKGROUND OF THE INVENTION

Sodium ion batteries are very similar in many ways to lithium ion batteries that are in common use today; they are both reusable secondary batteries that comprise an anode (negative electrode), a cathode (positive electrode) and an electrolyte material, both are capable of storing energy and they both charge and discharge via a similar reaction mechanism. When a sodium-ion battery (or lithium-ion battery) is charging, Na+ (or Li+) ions de-intercalate and migrate towards the anode whilst charge balancing electrons pass from the cathode through the external circuit containing the charger and into the anode of the battery. During discharge the same process occurs but in the opposite direction. Once a circuit is complete electrons pass back from the anode to the cathode and the Na+ (or LI+) ions travel back to the cathode.

Lithium-ion battery technology has been utilised in many applications, and is used in portable devices extensively; however lithium is not a hugely abundant material and is expensive to use in large scale applications. Sodium-ion technology is still a new technology but the high abundance of sodium on the earth, and a significantly lower cost of sodium compared to lithium give sodium ion an advantage over lithium ion technologies. Researchers predict that sodium ion will provide a cheaper and more durable way to store energy in the future, especially for large scale applications such as grid level energy storage.

US 2012/0227252 A1 describes the preparation of lithium transition metal silicates, and in particular the preparation of a silicate cathode for a lithium ion battery comprising: preparing an Olivine structure having a flake-like structure; carbon coating the Olivine structure; and shaping the Olivine structure for use as part of a cathode.

US 2013/0052544 A1 (2010) teaches a cathode material which contains a lithium transition metal silicate of small particle size and low crystallinity. The material is described to be a useful cathode active material in a non-aqueous electrolyte secondary battery, capable of undergoing a charge-discharge reaction at room temperature.

However, not all lithium transition metal silicates are found to be effective in battery applications. A literature review: "Silicate Cathodes for Lithium Batteries: Alternatives To Phosphates?" by Bruce et al in J. Mater. Chem., 2011, 21, 9811, highlights the difficulties encountered when $Li_2MSiO_4$ compounds are used. For example, R. Dominko et al., in J. Power Sources, Vol. 174, Issue 2, 6 Dec. 2007, pp 457-461, report that lithium extraction from $Li_2MnSiO_4$ during initial charging appears to cause significant structural changes so that the resulting material is only able to reversibly exchange limited amount of lithium.

$Li_2MetalSiO_4$ compounds also generally have low rate capabilities compared with their phosphate analogues, and as reported by Bruce et al. in Chem. Commun., 2007, 4890-4892, the capacity to extract lithium is very low from all cobalt polymorphs. Although they also report that this could be improved when these materials were coated with carbon, they found that this was very difficult to achieve because when the material was fired to the carbonisation temperatures, it reduced to lithium silicate and cobalt metal. The only polymorph which they managed to carbon coat, had a reversible capacity of only 60 mAhg$^{-1}$.

Further literature for example by Nyten et al in Electrochemistry Communications 7 (2005) 156-160, reports the electrochemical performance of $Li_2FeSiO_4$, $Li_2FeGeO_4$, and Yang et al in Electrochemical and Solid State Letters, 11 (5) A60-63 (2008) and in Electrochemical and Solid State Letters, 12 (7) A136-39 (2009), report that the electrochemical performance of $Li_2FeSiO_4$ can be Improved by the addition of a carbon coating.

In a different approach, WO 2010/066439 A2, describes alkali metal doped phosphate materials which are reported to be electrochemically active and suitable electrode materials for use in primary and secondary batteries. The compounds described contain between 60 and 90 Mol % phosphate ions ($PO_4^{3-}$), and although relatively small amounts (up to a maximum of 31 Mol %) of the phosphate ions may be substituted with one or more anions including silicate ions ($SiO_4^{4-}$), this prior art warns against substituting more than about 30 Mol % of the $PO_4^{3-}$ because the resulting compounds are unstable.

Sodium ion analogues $Na_2MgSiO4$ and $Na_2ZnSiO4$ are reported in Solid State Ionics 7 (1982) 157-164; Solid State Ionics 18 &19 (1986) 577-581 and Mat. Res. Bull., (1989), Vol. 24, pages 833-843, to be useful ionic conductors. However, although conductivity tests have been performed, neither magnesium nor zinc in these materials is redox active and consequently, the materials are not capable of sodium removal on first charge or of being useful in a sodium ion battery application.

Similarly, WO2014/050086 (Toyota) teaches $NaFeSi_2O_6$ materials in which the oxidation state of the iron is +3. Consequently, this compound is not redox active upon oxidation, and is not capable of sodium removal on first charge or of being useful in a sodium-ion battery application.

WO2012/004839A1 (Mitsubishi) discloses some 43 sodium-oxide composite materials for use in the positive electrode of a secondary battery, including $Na_2MnSiO_4$. However, the present Applicant has found that this manganese material exhibits low reversible capacity in a sodium-ion cell; consequently, this compound is specifically excluded from the active materials used in the electrode of the present invention.

U.S. Pat. No. 6,872,492 B2 (Valence) describes a material for a sodium ion cathode with the formula of $A_aM_b(XY_4)_cZ_d$, where ($XY_4$) is defined as selected from the group consisting of $X'O_{4-x}$, $Y'_x$, $X'O_{4-y}$, $Y'_{2y}$, $X''S_4$, and mixtures thereof, where X' is selected from the group consisting of P, As, Sb, Si, Ge, S and mixtures thereof; X" is selected from the group consisting of P, As, Sb, Si, Ge and mixtures thereof; Y' is selected from the group consisting of halogen, S, N, and mixtures thereof; $0 \le x < 3$; and $0 < y \le 2$; and $0 < c \le 3$. This patent encompasses a very large number of materials, however, there are no specific examples relating to the silicate containing materials used in the present invention, moreover, there is no electrochemical data or any other evidence which, in view of the capricious nature of the lithium analogues, is needed to show, or to assist the skilled person to predict, which if any of the $SiO_4$-containing materials have suitable electrochemical characteristics for use in an electrode or as being able to perform in a sodium-ion battery application.

US2003/170542A1 (Valence) broadly discloses a large number of electrode active compounds comprising the general structure: $A_{a+x}M_bP_{1-x}Si_xO_4$, in which x may be in the range 0≤x≤1. As with the Valence patent document discussed above, none of the compounds used in the present invention are disclosed in an individualised form in this prior art, nor is any evidence given in this prior art regarding the ability of such materials to exhibit favourable electrochemical characteristics, or any clue that would assist the skilled person to predict that the compounds of the present invention are capable of sodium removal on first charge.

Finally, U.S. Pat. No. 4,166,159A (Pober) discloses $Na_{1+x}Zr_2Si_xP_{3-x}O_{12}$ materials for use as solid electrolytes in sodium (but not sodium-ion) batteries. Such prior art sodium batteries do not rely on the intercalation of sodium ions and are not capable of reversible charge-discharge cycling; i.e. they are not rechargeable. There is no teaching in this prior art that such materials are useful in electrodes for sodium-ion batteries or are capable of producing electrodes which undergo sodium removal on first charge or which are capable of multiple chare-discharge cycles.

In conclusion, none of the above literature references provide any basis on which to judge which sodium metal silicates are capable of reversibly intercalating sodium ions during repeated charge-discharge cycles. Specifically, none of the prior art discussed above teaches which sodium-containing transition metal silicates are able to undergo sodium removal on first charge, or, which would be suitable active materials for use in electrodes of the present invention, in sodium-ion battery applications, particularly in cathode electrodes.

SUMMARY OF INVENTION

Thus, the present invention aims to provide an electrode preferably, a cathode electrode.

The Applicants of the present invention have identified that certain sodium transition metal silicates unexpectedly show excellent electrochemical characteristics. The sodium transition metal silicate materials used in the electrodes of the present invention, have a much higher than expected (based on the reported results for the lithium analogues) initial specific discharge capacity, excellent reversibility, particularly in the case of sodium iron silicate and sodium cobalt silicate, and suffer very little first cycle loss. The high reversibility is an indication that the structural changes which materials used in the present invention undergo are not as great as those experienced by analogous lithium materials; i.e. the sodium transition metal silicates have a more stable structure during cycling.

As discussed in more detail below, the sodium transition metal silicate materials used in the present invention can be made by any suitable process, for example a solid state process, or by a combined co-precipitation and solid state process. Further, in contrast to some of the lithium materials discussed above, it been surprisingly found that it is not necessary for the sodium transition metal silicates used in the present invention to coated with carbon. Indeed, if carbon is used, detrimental effects such as the reduction to sodium silicate and the metal are often observed, similar to those discussed above in relation to lithium cobalt silicate. However, the ability to reversibly intercalate sodium without the need for carbon is an indication that the energy barrier to diffusion for the sodium transition metal silicate materials, is likely to be lower than that in the corresponding lithium materials, and that the band gap is closer to that of a conductor rather than an insulator.

Therefore the first aspect of the present invention provides an electrode comprising a one or more sodium-containing transition metal silicate compounds of the formula:

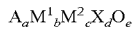

wherein
A comprises sodium, or a mixture of sodium with lithium and/or potassium,
$M^1$ comprises one or more transition metals, wherein $M^1$ is capable of undergoing oxidation to a higher valence state,
$M^2$ comprises one or more non-transition metals and/or metalloids,
X comprises at least 40 mol % silicon,
a is >0,
b is >0
c is ≥0,
d is ≥1,
e is ≥2,
wherein the values of a, b, c, d, and e are selected to maintain the electro neutrality of the compound and further wherein the one or more sodium-containing transition metal silicate compounds does not include $Na_2MnSiO_4$.

The value of one or more of a, b, c, d and e may be an integer i.e. a whole number or a non-integer i.e. a fraction.

The sodium-containing transition metal silicates used in the electrodes of the present invention are redox active materials and are capable of sodium removal upon first charge.

Moreover, the sodium-containing transition metal silicates used on the electrodes of the present invention are capable of high reversible capacity in a sodium-ion cell.

The amount of sodium or mixture of sodium and lithium and/or potassium is preferably in the range 0<a≤4, further preferably in the range 1≤a≤3, and especially in the range 1≤a≤2.5. Preferably sodium is present as the major alkali metal component.

Preferably $M^1$ comprises one or more transition metals selected from titanium, vanadium, chromium, manganese, iron, cobalt, nickel, copper, yttrium, zirconium, niobium, molybdenum, rhodium, palladium, silver, cadmium, hafnium, tantalum, tungsten, osmium, platinum and gold. Further preferably $M^1$ comprises one or more transition metals selected from iron, cobalt, manganese, nickel, chromium and vanadium. Ideally, when used, iron is in oxidation state +2, cobalt is in oxidation state +2, and vanadium is in oxidation state of +3 and/or +4.

The amount of $M^1$ is preferably in the range 0<b≤5, further preferably in the range 0.25≤b≤3, especially in the range 0.5≤b≤2, and most advantageously 0.5≤b≤1. As defined above, the one or more transition metals $M^1$, when they are part of the sodium transition metal silicate compounds used in the electrode of the present invention, are capable of undergoing oxidation to a higher valence state, that is, they are redox active.

Preferably $M^2$ comprises one or more metals and/or metalloids selected from the list comprising magnesium, zinc, calcium, beryllium, strontium, barium, aluminium and boron.

The amount of $M^2$ is preferably in the range 0<c≤1, further preferably in the range 0≤c<0.75; advantageously in the range 0≤c≤0.55; specifically in the range 0.05≤c≤0.55.

The amount of silicon in X must be at least 40 mol %, preferably at least 50 mol % and further preferably 80-100 mol %. 100 mol % silicon is ideal. When X is at least 40 mol % and less than 100 mol % silicon, then the balance (i.e. 60 mol % or less of X) preferably comprises one or more elements selected from phosphorus, boron and aluminium.

The amount of X (i.e. silicon alone or a mixture comprising silicon and for example one or more elements selected from phosphorus, boron and aluminium, in the amounts discussed above) is preferably in the range $1 \leq d \leq 8$, further preferably in the range $2 \leq d \leq 8$. Compounds with d=2 are especially preferred. Where boron and/or aluminium are included in the $X_dO_e$ portion of the compound then this is in addition to any boron and/or aluminium included in $M^2$.

The amount of oxygen is preferably in the range $2 \leq e \leq 24$, further preferably in the range $2 \leq e \leq 8$, and advantageously in the range $2 \leq e \leq 6$. Compounds with e in the range $6 \leq e \leq 8$, are especially preferred.

In highly preferred compounds, $X_dO_e$ is a silicate group which may be selected from $SiO_4$, and condensed silicate polyanions including $Si_2O_6$, $Si_2O_7$, $Si_2O_8$, $Si_8O_{24}$, $Si_3O_{12}$. Preferred silicates are selected from $SiO_4$, $Si_2O_6$ and $Si_2O_7$.

Particularly advantageous sodium-containing transition metal silicate compounds of the present invention include:
$Na_2M^1SiO_4$, where $M^1$=Co, Fe, Ni
$Na_2Mn_{0.5}Fe_{0.5}SiO_4$
$Na_2Fe_{1-x}Mg_xSiO_4$
$Na_2Fe_{0.9}Mg_{0.05}SiO_4$
$Na_2Fe_{0.9}Mg_{0.1}SiO_4$
$Na_{1.8}Mg_{0.1}FeSiO_4$
$Na_2Fe_{0.9}Al_{0.05}Li_{0.05}SiO_4$
$Na_2Ti_{0.45}Zn_{0.55}SiO_4$
$Na_2FeSi_2O_6$
$Na_2Ni_2Si_2O_7$
$Na_2V_{0.5}Si_2O_6$
$Na_2M_3Si_2O_8$
$Na_2M^1{}_2Si_2O_7$, where $M^1$=Mn, Co, Ni or Fe,
$Na_{2.1}Mn_{1.9}Si_2O_7$,
$Na_3M^1Si_2O_7$, where $M^1$=V, Mn, Cr,
$Na_2M^1Si_2O_6$, where $M^1$=Mn, Co, Ni, Fe,
$NaM^1Si_2O_6$, where $M^1$=Mn, Fe, Mo, V, Cr, Y, Ti,
$NaV_{0.5}Al_{0.5}Si_2O_6$,
$NaV_{0.75}Al_{0.25}Si_2O_6$,
$NaV_{0.5}Y_{0.5}Si_2O_6$,
$NaV_{0.75}Ti_{0.1875}Si_2O_6$,
$NaV_{0.5}Ti_{0.375}Si_2O_6$,
$NaV_{0.75}B_{0.25}Si_2O_6$,
$NaV_{0.5}B_{0.5}Si_2O_6$,
$NaYSi_2O_6$,
$NaV_{0.25}Ti_{0.5625}Si_2O_6$,
$NaV_{0.125}Ti_{0.6563}Si_2O_6$,
$NaV_{0.5}Cr_{0.5}Si_2O_6$,
$NaV_{0.25}Cr_{0.75}Si_2O_6$,
$NaTiSi_2O_6$,
$NaV_{0.5}Ti_{0.5}Si_2O_6$,
$NaV_{0.75}Si_2O_6$,
$NaV_{0.5}Si_2O_6$,
$Na_{2.5}M^1Si_2O_6$, where $M^1$=V, Fe, Cr, Mn, Ni
$Na_2M^1{}_3Si_2O_8$, where $M^1$=Mn, Co, Ni, Fe,
$Na_3M^1{}_5Si_8O_{24}$, where $M^1$=Mn, Co, Fe, Ni
$Na_{1.8}MSi_{0.8}P_{0.2}O_4$; where M=+2 oxidation state metal
$Na_{1.5}MSi_{0.5}P_{0.5}O_4$; where M=+2 oxidation state metal
$Na_{1.6}M_2Si_{1.6}P_{0.4}O_7$; where M=+2 oxidation state metal
$Na_{1.8}M_2Si_{1.8}P_{0.2}O_7$; where M=+2 oxidation state metal
$Na_{2.2}MSi_{1.8}B_{0.2}O_4$; where M=+2 oxidation state metal
$Na_{2.4}MSi_{0.6}Al_{0.4}O_4$; where M=+2 oxidation state metal In a second aspect, the present invention provides an energy storage device that utilises an electrode comprising one or more of the sodium-containing transition metal silicate active compounds according to the present invention as described above, and particularly an energy storage device for use as one or more of the following: a sodium ion and/or lithium ion and/or potassium ion cell; a sodium metal and/or lithium metal and/or potassium metal ion cell; a non-aqueous electrolyte sodium ion and/or lithium ion and/or potassium ion cell; an aqueous electrolyte sodium ion and/or lithium ion and/or potassium ion cell.

In a third aspect, the present invention provides an energy storage device comprising one or more sodium-containing transition metal silicate compounds according to the present invention. Such an energy storage device may be, for example, a secondary or rechargeable battery, a sodium-ion battery, an electrochemical device, an electrochromic device or another electrical energy storage device, including a large scale grid level electrical energy storage system or device.

Further in a fourth aspect, the present invention provides for the use of one or more sodium-containing transition metal silicate compounds according to the present invention in an energy storage device such as a secondary or rechargeable battery, a sodium ion battery, an electrochemical device, an electrochromic device or another electrical energy storage device, including a large scale grid level electrical energy storage system or device.

When the sodium-containing transition metal silicate compounds according to the present invention are used in electrode, battery or other energy storage applications, as described above, it is preferable to coat the silicate compounds with a conductive material. Any known conductive material suitable for the purpose may be used, and any known method of forming such a coating of conductive material may be used. Carbon is one possible suitable material, and a carbon coating may be produced for example by adding ground carbon to one or more of the starting materials, or to the sodium-containing transition metal silicate compound made therefrom, Alternatively, the carbon coating may be formed by pyrolysing the starting materials or the sodium-containing transition metal silicate made therefrom, in the presence of a carbon containing material such as an organic material.

The sodium-containing transition metal silicate compounds of the present invention may be prepared using any known and/or convenient method. For example the precursor materials may be heated in a furnace so as to facilitate a solid state reaction process. An organic material may be added prior to heating, to facilitate the formation of a conductive carbon coating as described above. In another example, the precursors may be mixed in such a manner to form a solution and then a gel, which is then dried and heated in a furnace. Further the conversion of a sodium-ion rich material to a lithium-ion rich material may be effected using an ion exchange process.

BRIEF DESCRIPTION OF DRAWINGS

FIG. 7 shows the X-ray diffraction pattern of $Na_{2.5}V_{0.5}Si_2O_6$ synthesised according to Example 7.

SPECIFIC EXAMPLES

Figure 1:
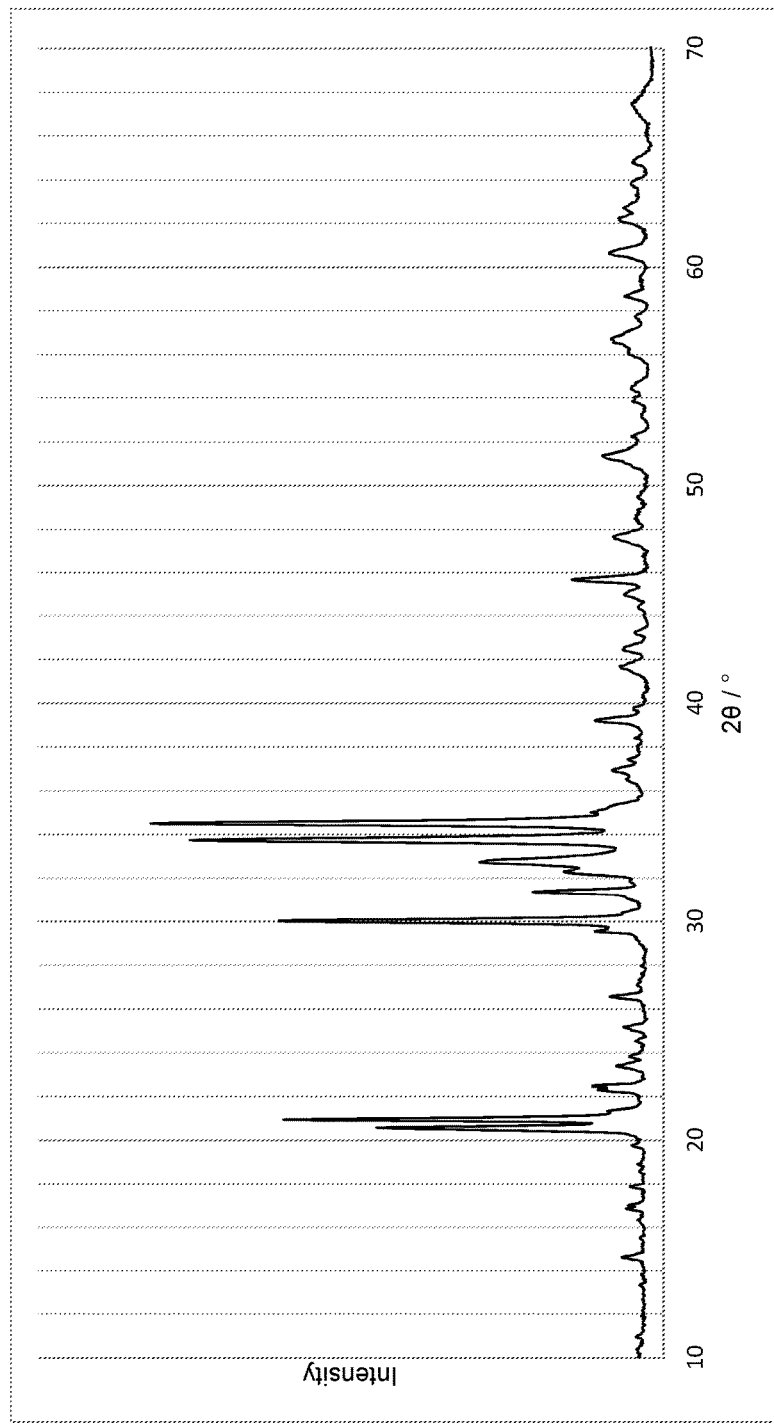
FIG. 1 shows the X-ray diffraction pattern of $Na_2MnSiO_4$ synthesised by the solid state method according to Example 1 (comparative example).

The materials according to the present invention may be prepared using one of the following generic methods:

Generic Solid State Synthesis Method:

The required amounts of the precursor materials are intimately mixed together and pressed into a pellet. The resulting mixture is then heated in a tube furnace or a chamber furace using either an ambient air atmosphere, or a flowing inert atmosphere (e.g. argon or nitrogen), at a furace temperature of between 200° C. and 1500° C. until reaction product forms. For some materials a single heating step is used and for others (as indicated below in Table 1) more than one heating step is used. The reaction product is removed from the furace and ground into a powder.

Generic Sol-Gel Synthesis Method

Precursor materials such as TEOS, transition metal salt and a sodium salt are dissolved in water, or an organic solvent or a mixture mix. This solution is first left to equilibrate to form a sol; a gel is either formed by evaporating some of the solvent or by the addition of a gelling agent. One gelled the gel is then aged and then dried, before firing to temperature similar to those described in the other synthesis methods above.

Generic Co-Precipitation Synthesis Method

Precursor materials are dissolved in water, or a water/solvent mix, to this either sodium silicate solution or sodium hydroxide is added to precipitate out an intimate mix of the precursor metals. This mixture dried after either first reacting the precursors in the hydrothermal bomb or immediately dried. The resulting powder is then fired to temperatures between 200° C. and 1500° C. until the reaction product forms similar to the solid state method above.

TABLE 1

| EXAMPLE | TARGET COMPOUND | SYNTHESIS CONDITIONS |
| --- | --- | --- |
| 1 comparative | $Na_2MnSiO_4$ with 5% sucrose | Solid state method-$MnCO_3$ + $Na_2SiO_3 \cdot 5H_2O$. 650° C./9 hrs/$N_2$ Sucrose added to the reactants in an amount to be 5% of the final product |
| 2 | $Na_2Mn_{0.5}Fe_{0.5}SiO_4$ | Solid state method - $MnCO_3$ + $Na_2SiO_3$ + Fe-oxalate 750° C./9 hrs/$N_2$ |
| 3 comparative | $Na_2MnSiO_4$ | Sol-gel synthesis - Sodium citrate + Manganese Nitrate + TEOS* 650° C./9 hrs/$N_2$ |
| 4 | $Na_2FeSiO_4$ | Co precipitation method: Iron Nitrate + ascorbic acid/$Na_2SiO_3$ + NaOH, hydrothermal bomb then 650° C./9 hrs/$N_2$ |
| 5 | $Na_2Fe_{1-x}Mg_xSiO_4$ (X = 0.05) | Solid state method - $Na_2SiO_3$ + Iron oxalate + Magnesium Carbonate 650° C./9 hrs/$N_2$ |
| 6a | $Na_2CoSiO_4$ | Solid state method - $CoOOHCO_3$ + $Na_2SiO_3$ 800° C./9 hrs/$N_2$ |
| 6b | $Na_2CoSiO_4$ | Solid state method - $CoNO_3$ + $Na_2SiO_3$ 650° C./9 hrs/$N_2$ |
| 7 | $Na_{2.5}V_{0.5}Si_2O_6$ | Solid state method - $Na_2SiO_3$, $V_2O_5$, $SiO_2$, C Mixing: Planetary milling, 350 rpm for 0.5 h (solvent: Acetone) Temp: 650° C./6 hrs/$N_2$ |

*TEOS is tetraethylorthosilicate

Product Analysis Using XRD

All of the product materials were analysed by X-ray diffraction techniques using a Brucker Phaser D2 powder diffractometer to confirm that the desired target materials had been prepared, to establish the phase purity of the product material and to determine the types of impurities present. From this information it is possible to determine the unit cell lattice parameters.

The XRD patterns for the target compounds prepared in Examples 1-7 are illustrated in FIGS. 1-7, respectively.

Figure 2:
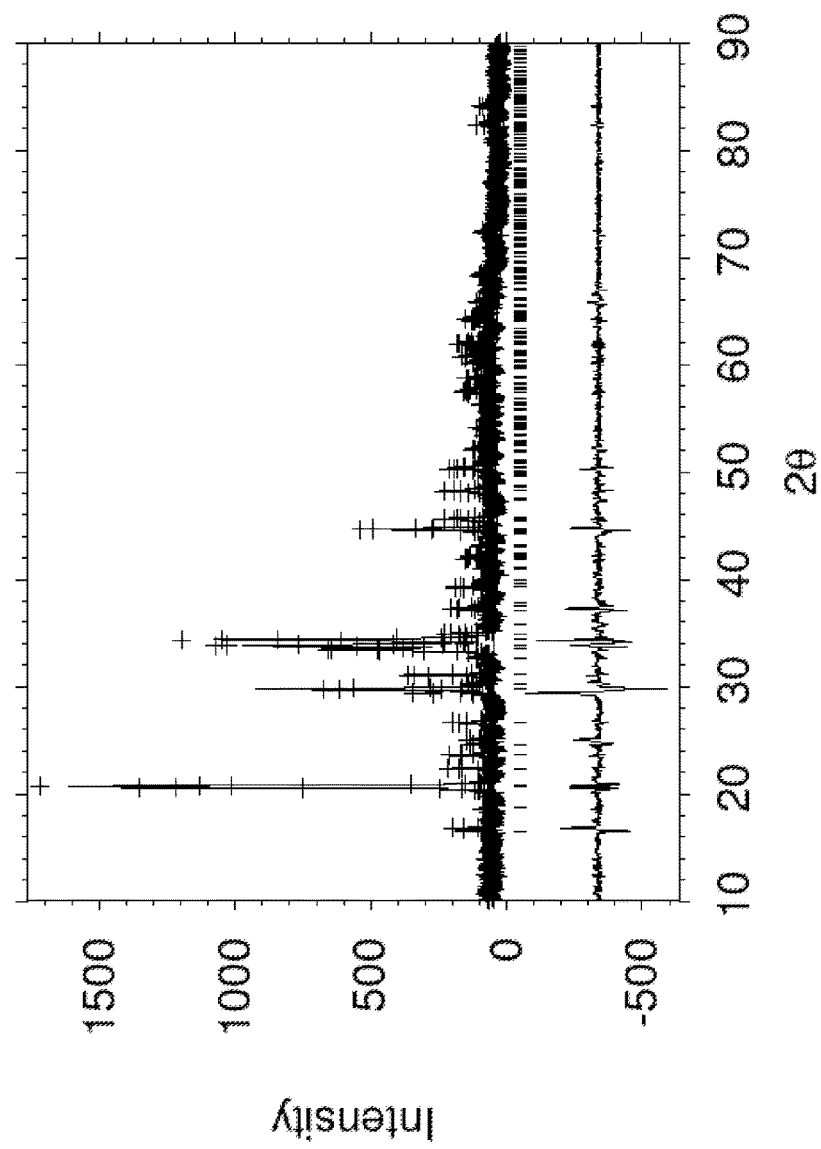
FIG. 2 shows the X-ray diffraction pattern of $Na_2Mn_{1/2}Fe_{1/2}SiO_4$ synthesised by the solid state method according to Example 2.
Figure 3:
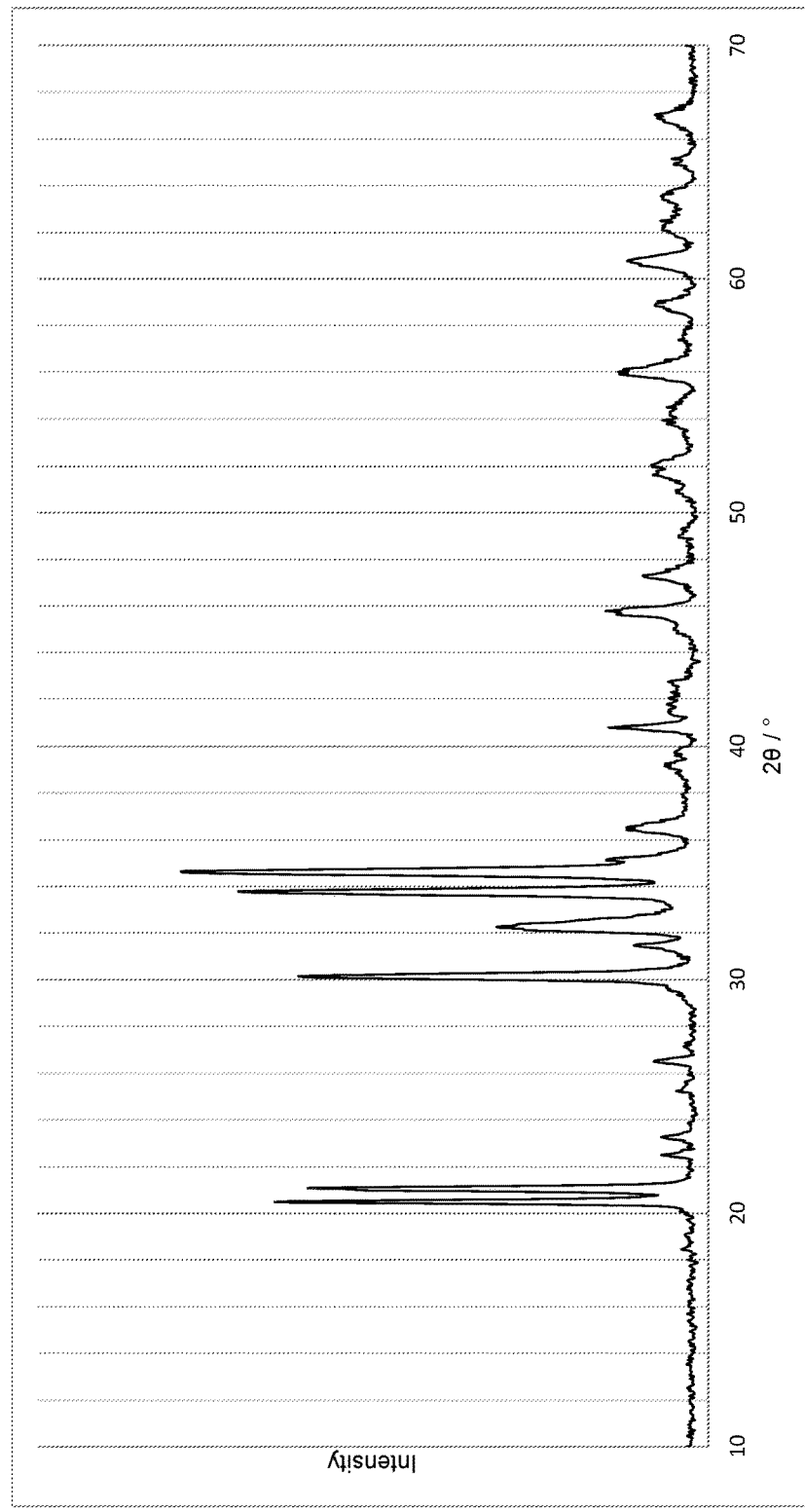
FIG. 3 shows the X-ray diffraction pattern of $Na_2MnSiO_4$ synthesised by the sol-gel method according to Example 3 (comparative example).
Figure 4:
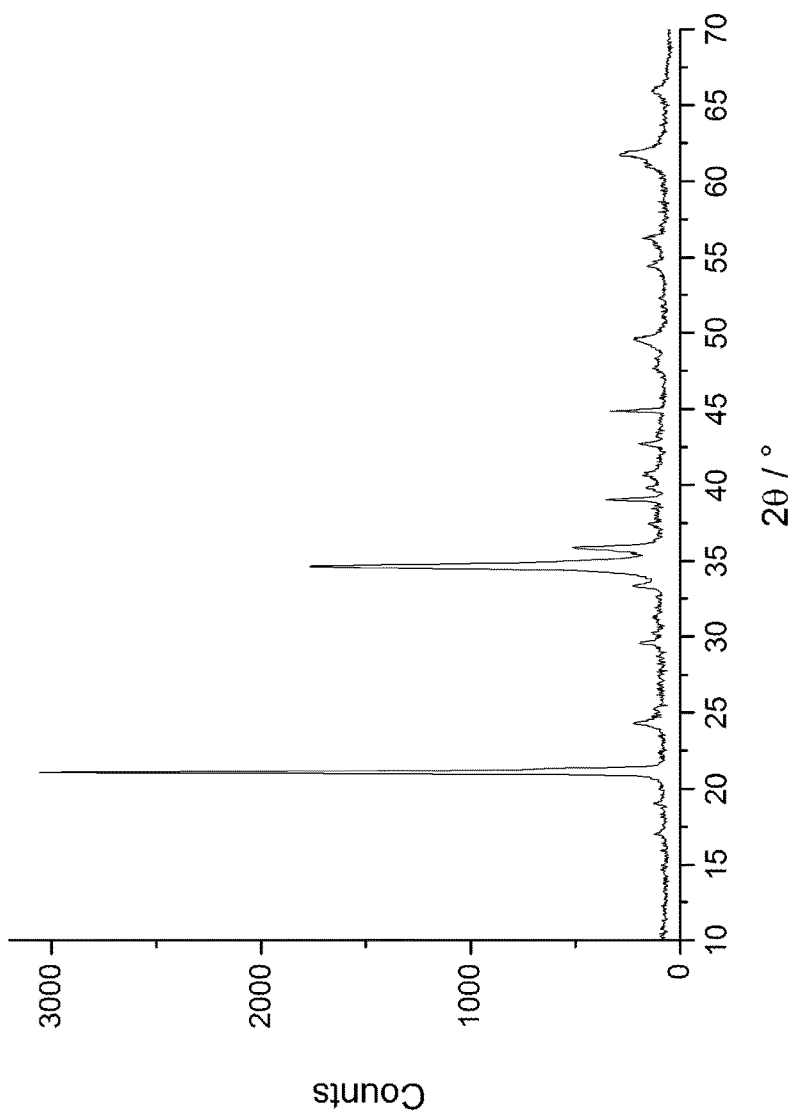
FIG. 4 shows the X-ray diffraction pattern of $Na_2FeSiO_4$ synthesised by the co-precipitation method according to Example 4.
Figure 5:
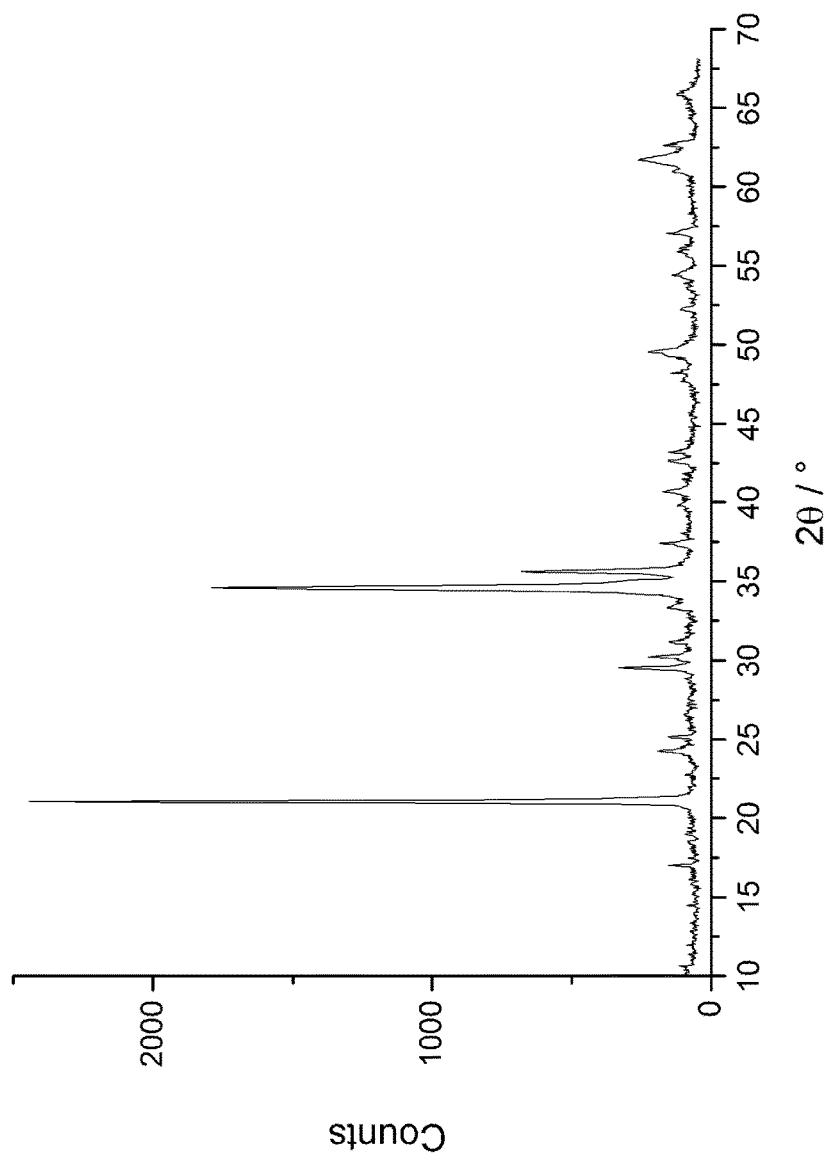
FIG. 5 shows the X-ray diffraction pattern of $Na_2Fe_{0.95}Mg_{0.05}SiO_4$ synthesised according to Example 5.

The X-ray Wavelength=1.5418 Å (Angstroms) (Cu Kα) and FIGS. 1 and 2 show the Rietveld refinement fit of (1) $Na_2MnSiO_4$ and (2) $Na_2Fe_{1/2}Mn_{1/2}SiO_4$. These examples show two different structure types of the $NaMSiO_4$ (M=Zn, Mg, Co, Ni, Cu, Fe) materials based upon the monoclinic P1n1 space group and the orthorhombic Pna space group respectively. FIGS. 3, 4, 5 and 6a and 6b show the X-ray diffraction pattern for $Na_2MnSiO_4$ (comparative), $Na_2FeSiO_4$, $Na_2Fe_{0.95}Mg_{0.05}SiO_4$, and $Na_2CoSiO_4$ (using two sources of cobalt), respectively, under the conditions 10°-70° 2 theta, 0.02 degree steps, (Cu Kα). FIG. 7 shows the XRD pattern for $Na_{2.5}V_{0.5}Si_2O_6$ produced under the conditions:

Radiation: Cu, 1.54056 A, 10°-60° 2 theta,
Speed: 1.5 seconds/step,
Increment: 0.05 degree/step.

Electrochemical Results

The target materials were tested either i) using a sodium metal anode test cell, ii) a lithium metal anode test cell or iii) a sodium ion test cell using a hard carbon anode. It is also possible to test these materials using a Li-ion cell with either a, graphite or hard carbon anode. Cells may be made using the following procedures:

Generic Procedure to Make Powder Electrode Sodium Metal Electrochemical Test Cell The positive electrode is prepared by milling carbon with the active material. The carbon used is C65 (Timcal). Alternatively the positive electrode is prepared by solvent-casting a slurry of the active material, conductive carbon, binder and solvent. The conductive carbon used is C65 (Timcal). PVDF (e.g. Kynar HSV900, Kureha W1100) is used as the binder, and NMP is employed as the solvent. The slurry is then cast onto a current collector and an electrode film is formed as the solvent evaporates. The electrode is then dried further at about 80° C. The electrode powder contains the following components, expressed in percent by weight: 80% active material, 20% C65 carbon. An aluminium current collector may be used to contact the positive electrode when using the slurry electrode coating method. Metallic sodium pieces may be employed as the negative electrode. The electrolyte comprises of the following: (i) 0.5M $NaClO_4$ in Propylene carbonate (PC). A glass fibre separator (Whatman, GF/A) or a porous polypropylene separator (e.g. Celgard 2400) wetted by the electrolyte is interposed between the positive and negative electrodes.

Generic Procedure to Make a Hard Carbon Na-Ion Cell

The positive electrode is prepared by solvent-casting a slurry of the active material, conductive carbon, binder and solvent. The conductive carbon used is C65 (Timcal). PVDF (e.g. Kynar HSV900, Kureha W1100) is used as the binder, and NMP is employed as the solvent. The slurry is then cast onto a current collector and an electrode film is formed as the solvent evaporates. The electrode is then dried further at about 80° C. Optionally, an aluminium current collector may be used to contact the positive electrode.

The negative electrode is prepared by solvent-casting a slurry of the hard carbon active material (Carbotron P/J, supplied by Kureha), conductive carbon, binder and solvent. The conductive carbon used is C65 (Timcal). PVDF (e.g. Kynar HSV900, Kureha W1100) is used as the binder, and NMP or acetone is employed as the solvent. The slurry is then cast onto a copper current collector and an electrode film is formed as the solvent evaporates. The electrode is then dried further at about 80° C. The electrode film contains the following components, expressed in percent by weight: 80% active material, 8% C65 carbon, and 12% PVDF-HFP (Kynar flex). Optionally, an aluminium current collector may be used to contact the negative electrode. The electrolyte comprises of the following: (i) 0.5M $NaClO_4$ in Propylene carbonate (PC). A glass fibre separator (Whatman, GF/A) or a porous polypropylene separator (e.g. Celgard 2400) wetted by the electrolyte is interposed between the positive and negative electrodes.

Generic Procedure to Make a Lithium Metal Anode Cell

The positive electrode is prepared by milling carbon with the active material. The carbon used is C65 (Timcal). Alternatively the positive electrode is prepared by solvent-casting a slurry of the active material, conductive carbon, binder and solvent. The conductive as carbon used is C65 (Timcal). PVDF (e.g. Kynar HSV900, Kureha W1100) is used as the binder, and NMP is employed as the solvent. The slurry is then cast onto a current an aluminium current collector and an electrode film is formed as the solvent evaporates. The electrode is then dried further at about 80° C. Lithium metal or Metallic lithium on a copper current collector may be employed as the negative electrode. The electrolyte comprises one of the following: (i) a 1 M solution of LiPF6 in ethylene carbonate (EC) and dimethyl carbonate (DMC) in a weight ratio of 1:1; (ii) a 1 M solution of $LiPF_6$ in ethylene carbonate (EC) and diethyl carbonate (DEC) in a weight ratio of 1:1; or (iii) a 1 M solution of $LiPF_6$ in propylene carbonate (PC) A glass fibre separator (Whatman, GF/A) or a porous polypropylene separator (e.g. Celgard 2400) wetted by the electrolyte is interposed 10 between the positive and negative electrodes.

Cell Testing

The cells are tested as follows using Constant Current Cycling techniques.

The cell is cycled at a given current density between pre-set voltage limits. A commercial battery cycler from Maccor Inc. (Tulsa, Okla., USA) is used. On charge, sodium (lithium) ions are extracted from the active material. During discharge, sodium (lithium) ions are re-inserted into the active material.

Electrochemical Results:

The data shown in FIGS. 8a and 8b and 9a and 9b are derived from the constant current cycling data for a $Na_2FeSiO_4$ and $Na_2Fe_{0.5}Mg_{0.05}SiO_4$ (respectively) active compounds in a Na-ion cell where this cathode material was coupled with sodium metal anode material. A Swagelok™ type cell was prepared in a glove box with active powder mix and sodium metal anode with 0.5M $NaClO_4$ in PC electrolyte.

The constant current data were collected at an approximate current density of 0.05 C between voltage limits of 1.50 and 4.30 V. The average voltage for the iron based examples are low at about 1.6V vs Na, however the specific capacities observed are approximately 100 mAhg−1 upon charge and 70 mAhg−1 upon $1^{st}$ discharge.

Figure 6A:
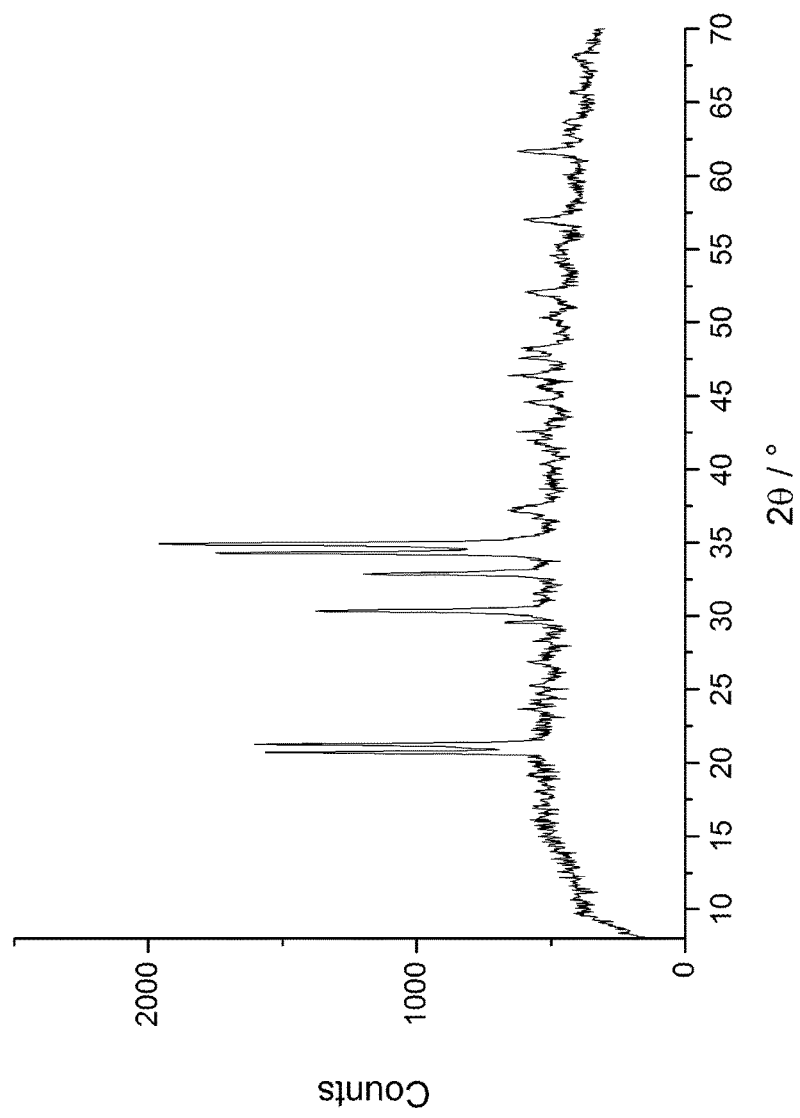
FIGS. 6a and b shows the X-ray diffraction pattern of $Na_2CoSiO_4$ synthesised according to Example 6a with cobalt carbonate precursor (monoclinic) and (b) using cobalt nitrate precursor (orthorhombic) according to Example 6b.
Figure 6B:
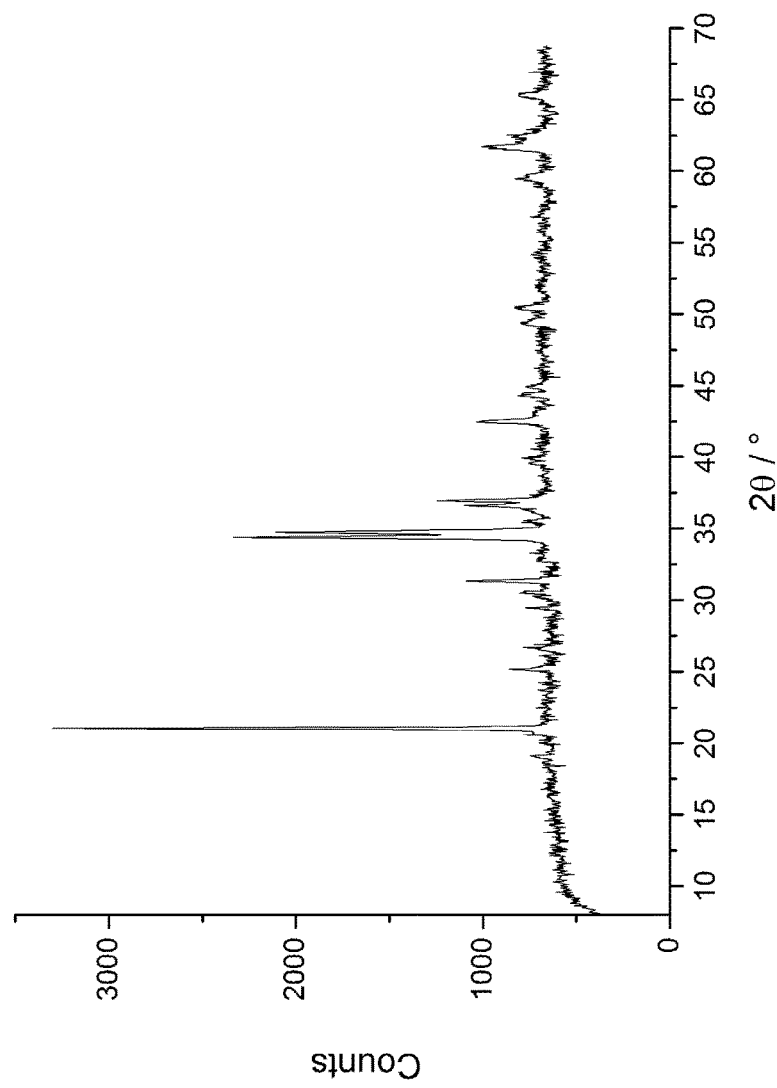
Figure 8A:
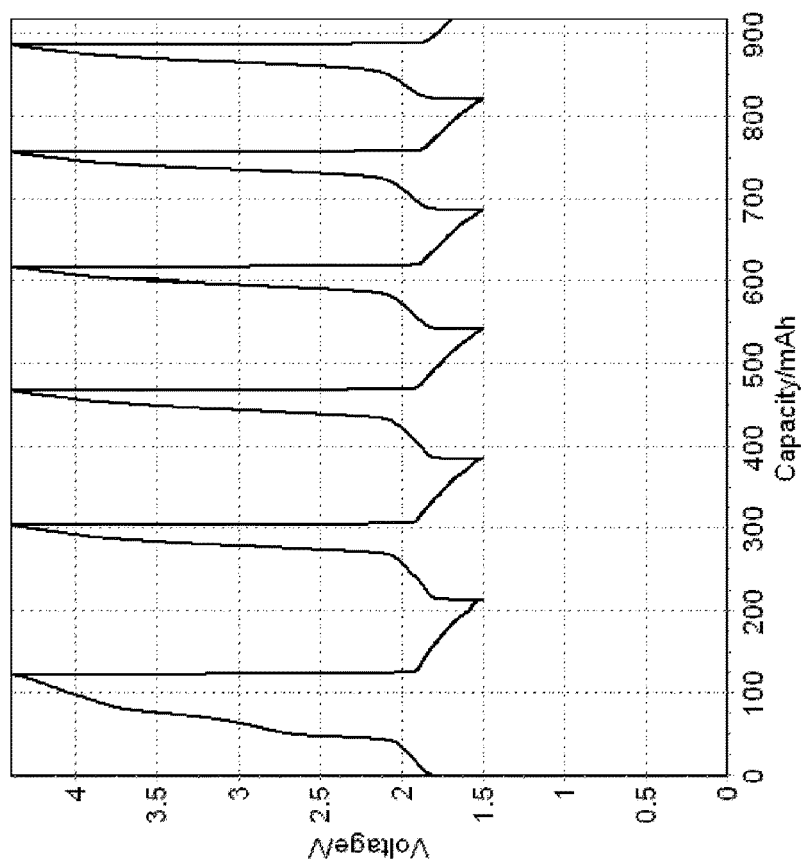
FIG. 8a illustrates the constant current cycling of $Na_2FeSiO_4$ synthesised according to Example 4 at 0.05 C charge and discharge current.
Figure 8B:
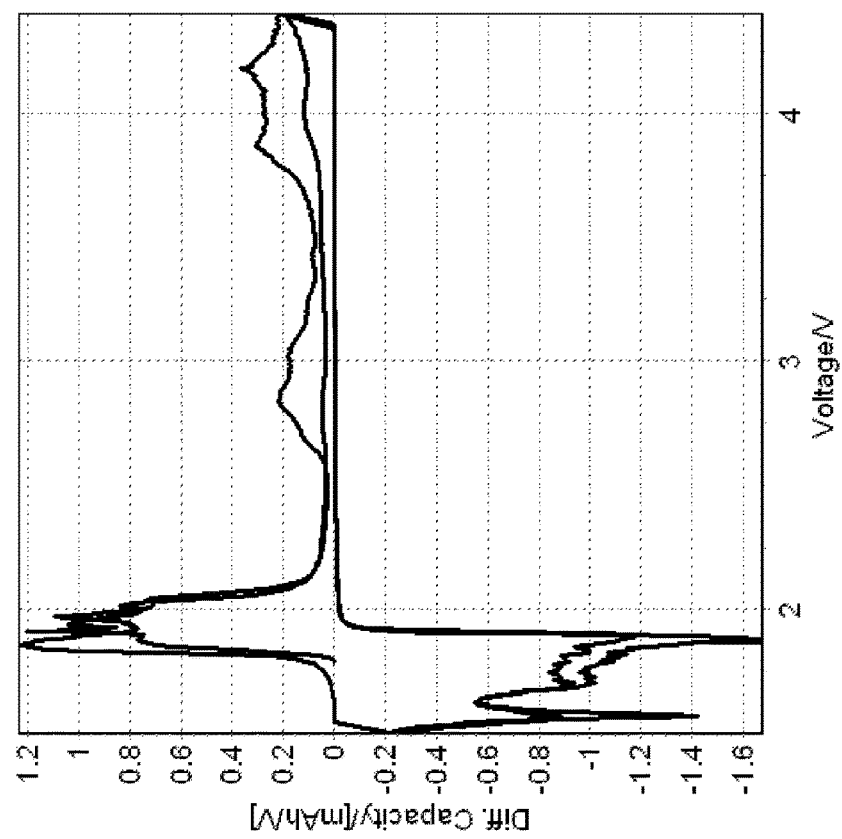
FIG. 8b illustrates the differential discharge capacity against voltage of $Na_2FeSiO_4$ synthesised according to Example 4 at 0.05 C charge and discharge current.
Figure 9A:
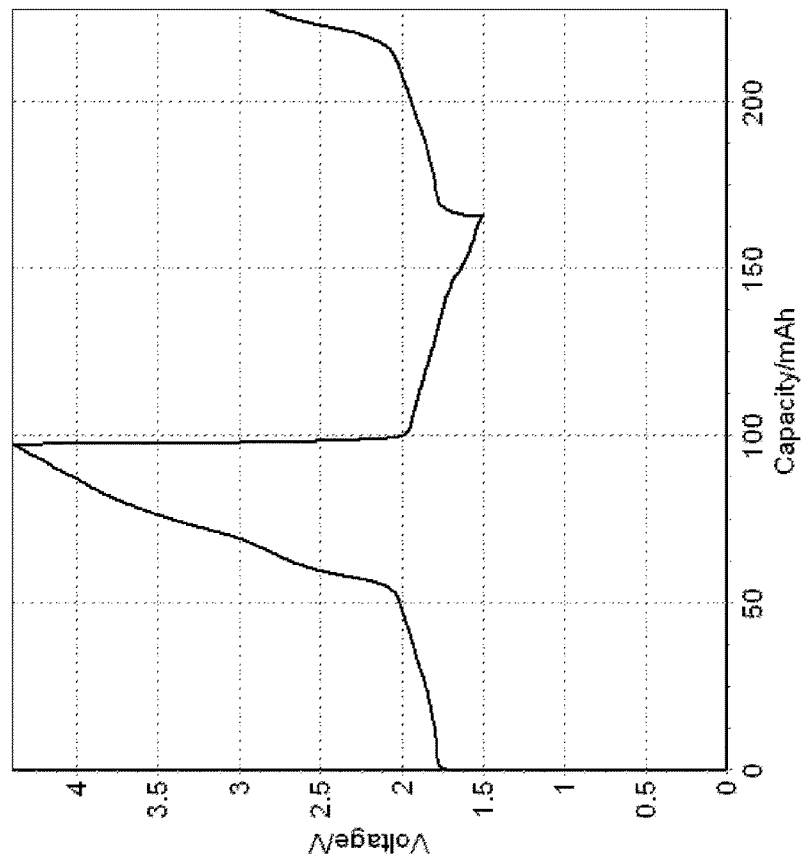
FIG. 9a illustrates the constant current cycling of $Na_2Fe_{0.95}Mg_{0.05}SiO_4$ synthesised according to Example 5 at 0.05 C charge and discharge current
Figure 9B:
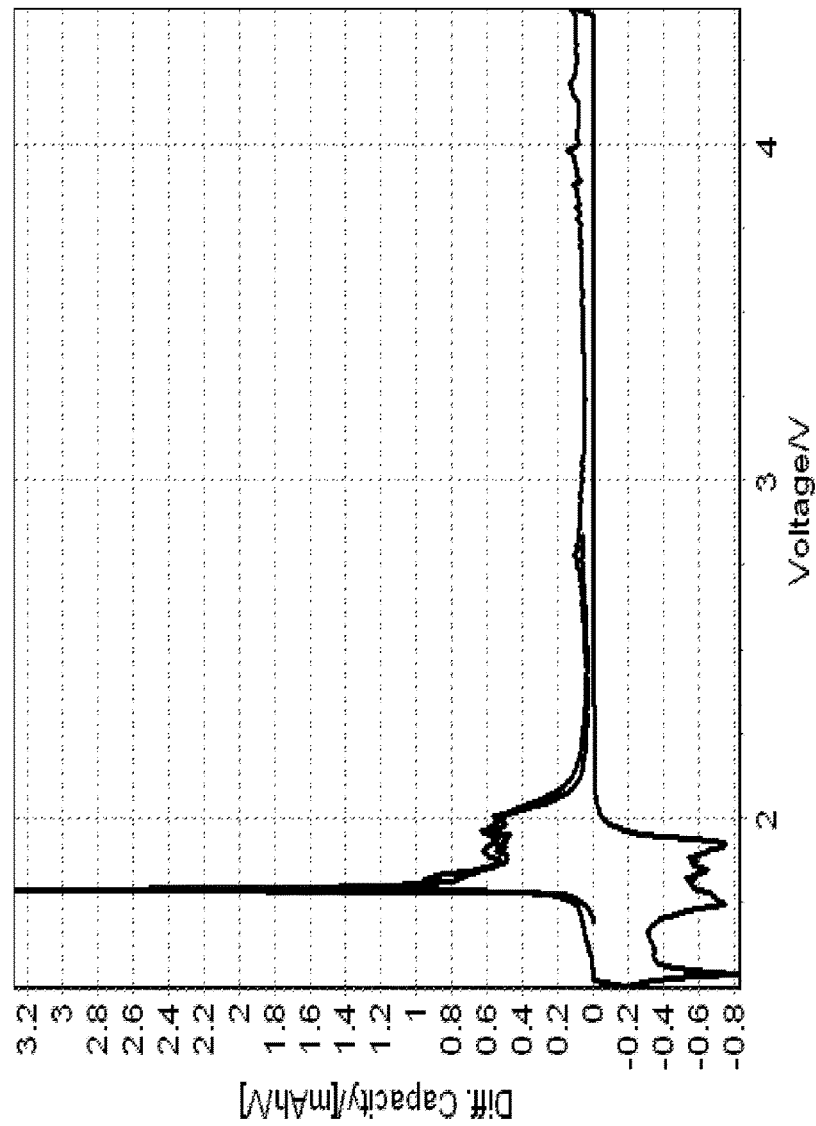
FIG. 9b illustrates the differential discharge current cycling of $Na_2Fe_{0.95}Mg_{0.05}SiO_4$ synthesised according to Example 5 at 0.05 C charge and discharge current.
Figure 10A:
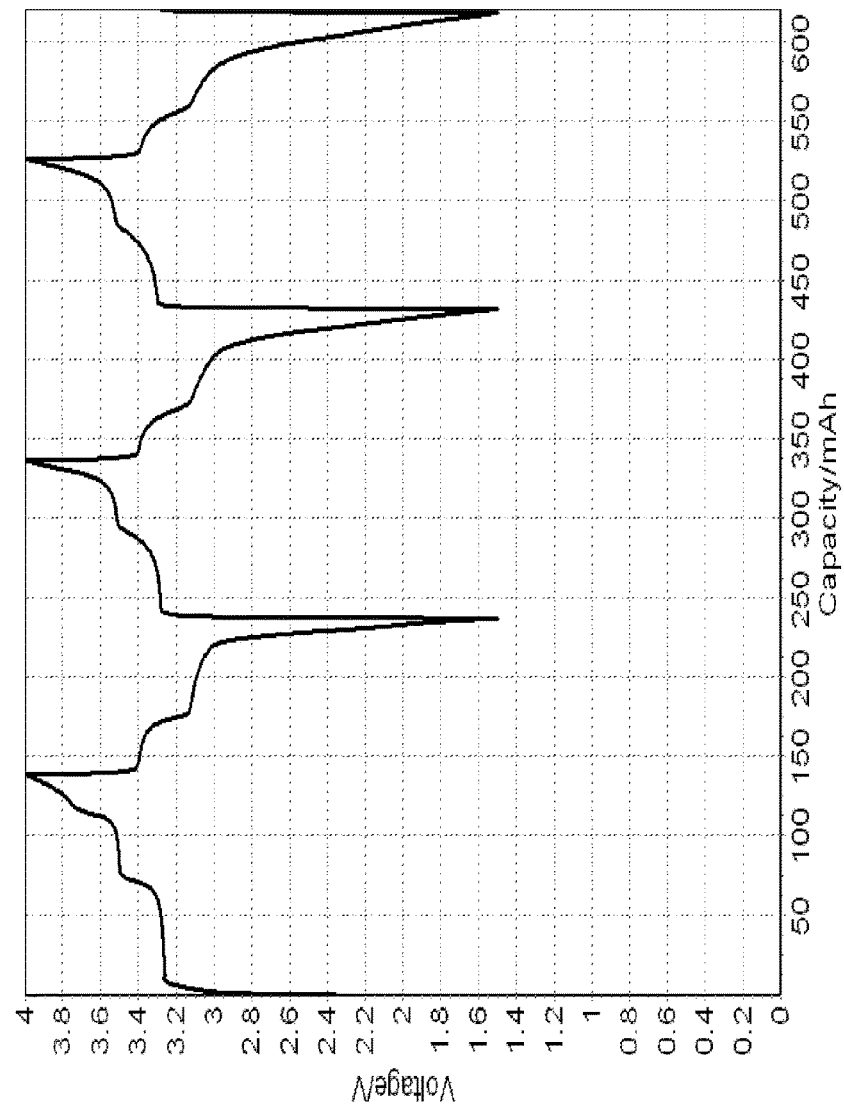
FIG. 10a illustrates the constant current cycling of $Na_2CoSiO_4$ synthesised according to Example 6a, at 0.05 C charge and discharge current
Figure 10B:
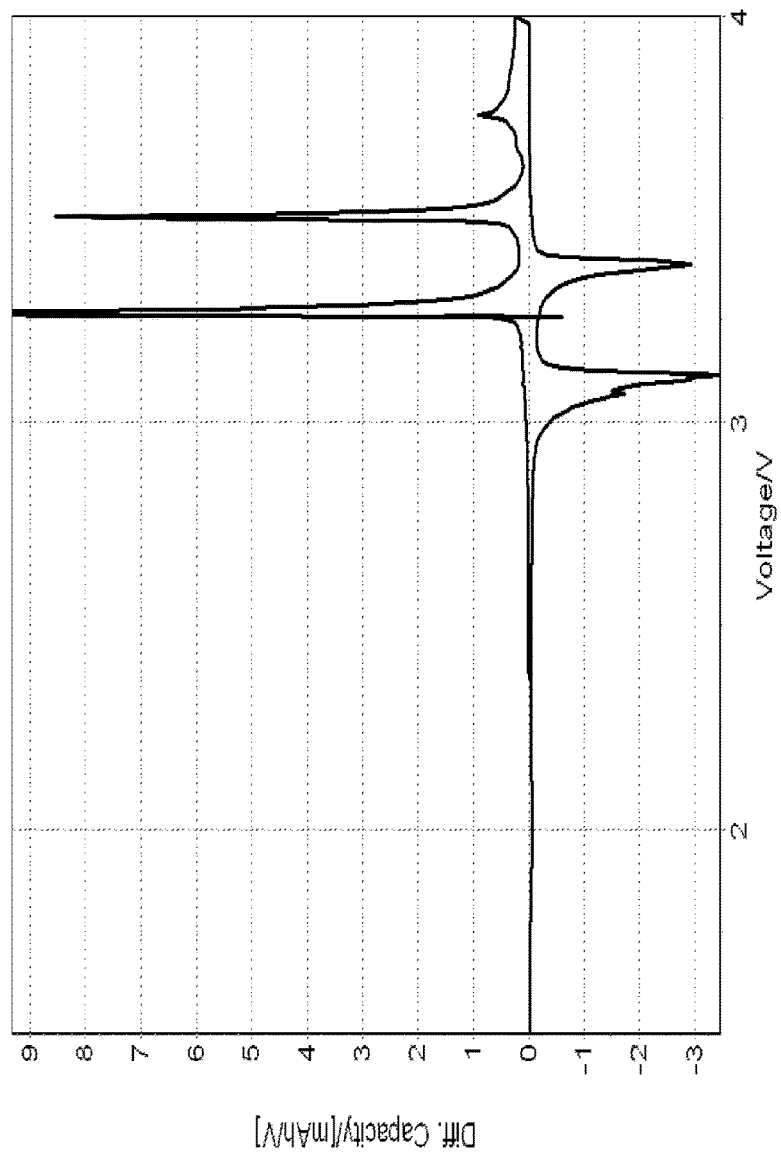
FIG. 10b illustrates the differential capacity against voltage of $Na_2CoSiO_4$ synthesised according to Example 6a, at 0.05 C charge and discharge current.
Figure 10C:
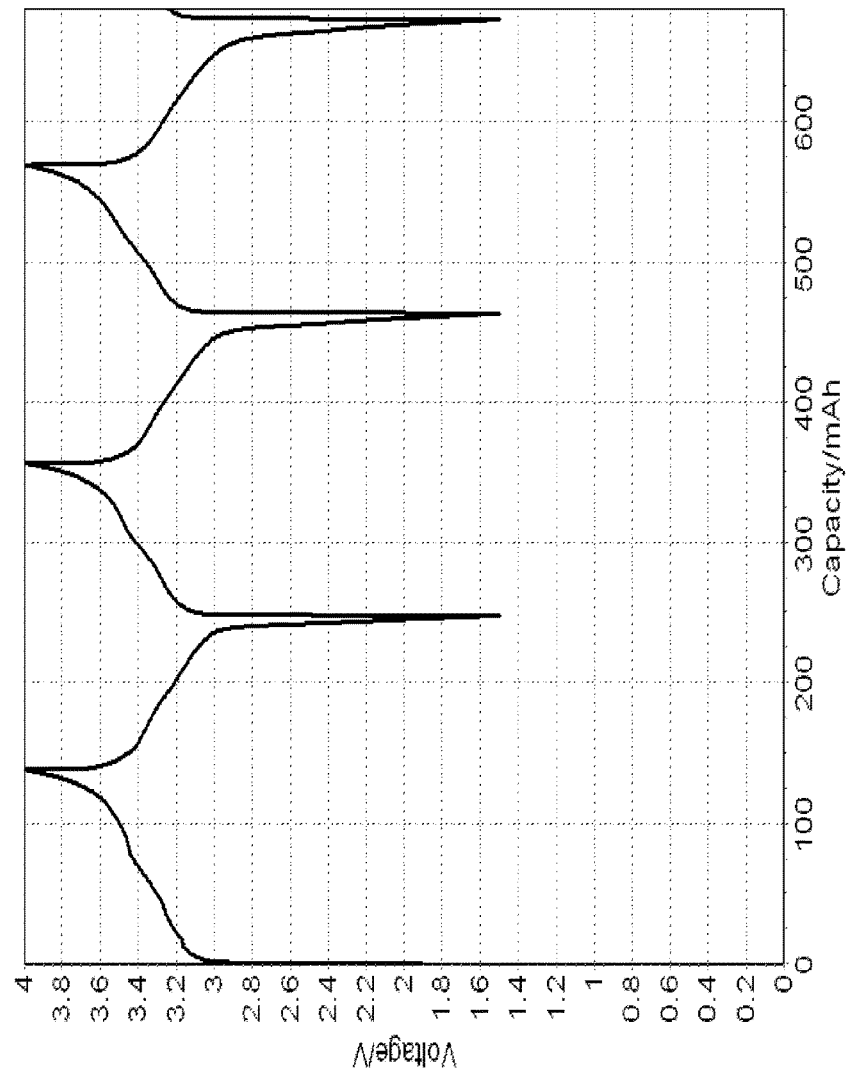
FIG. 10c illustrates the constant current cycling of $Na_2CoSiO_4$ synthesised according to Example 6b, at 0.05 C charge and discharge current.
Figure 10D:
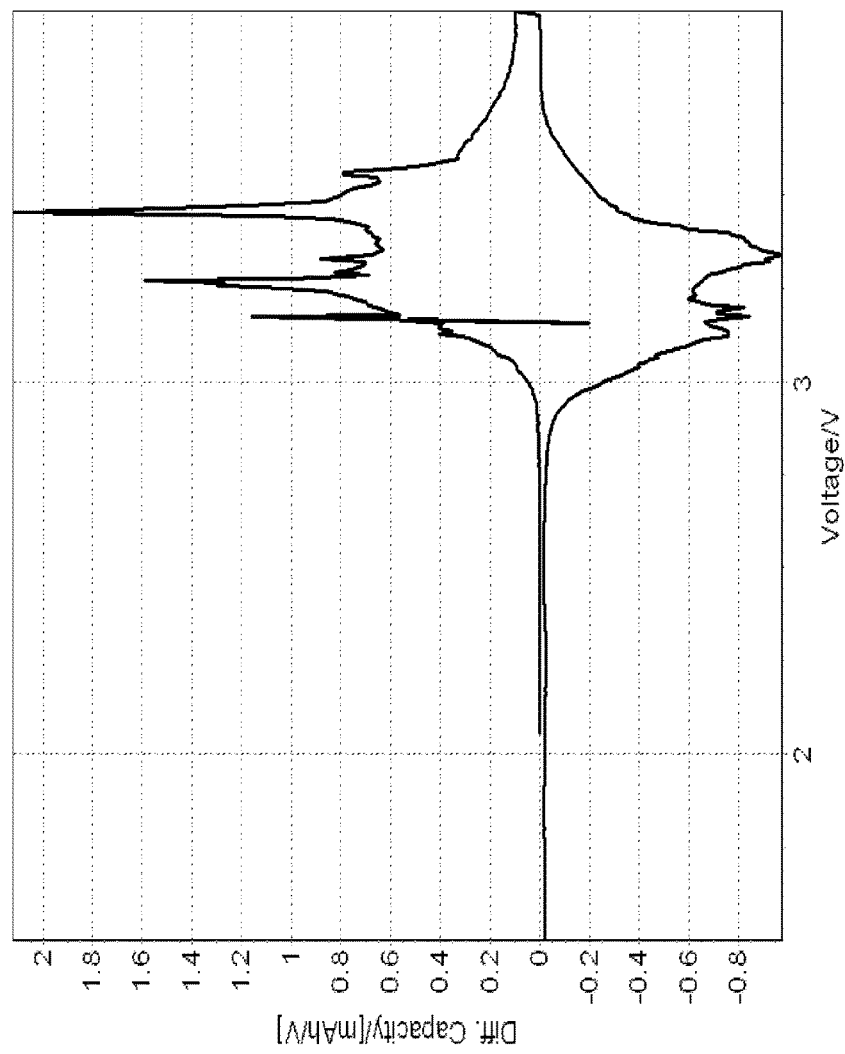
FIG. 10d illustrates the differential capacity against voltage of $Na_2CoSiO_4$ synthesised according to Example 6b, at 0.05 C charge and discharge current.

The data shown in FIGS. 10a and 10b is the constant current cycling for $Na_2CoSiO_4$ made using two different cobalt precursors per Examples 6a and 6b respectively, with Example 6a being made using cobalt carbonate and Example 6b being made using cobalt nitrate as detailed in Table 1 above. The two methods produce a slightly different crystal structure as shown in FIGS. 6a and 6b. Electrochemical results in a sodium half-cell using a powder mix of 80% active 20% carbon black show similar initial capacities in the voltage range 1.5V to 4.3V above this irreversible capacity is observed. Reversible capacities of 100 mAhg−1 are observed in both materials at an average voltage of 3.7V.

Figure 11A:
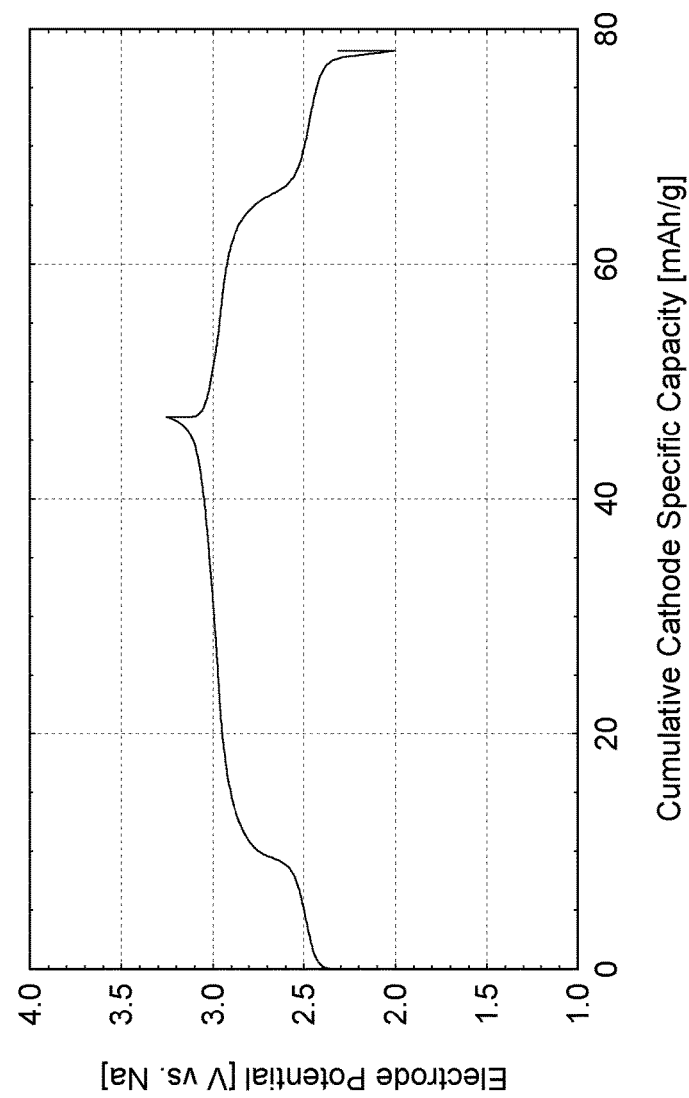
FIG. 11a illustrates the constant current cycling of $Na_{2.5}V_{0.5}Si_2O_6$, synthesised according to Example 7, in the voltage range 2.00-3.25 V vs. Na in 0.5 M $NaClO_4$ in PC.

FIG. 11a shows the second cycle constant current data (electrode potential versus cumulative cathode specific capacity) for the $Na_{2.5}V_{0.5}Si_2O_6$ active material (Sample S0195b). The constant current data were collected using a sodium metal counter electrode at a current density of 0.04 mA/cm², between voltage limits of 2.0 and 3.35 V vs. Na. The testing was carried out at room temperature.

Sodium ions are extracted from the active material during the charging of the cell. A charge equivalent to a material specific capacity of 47 mAh/g is extracted from the material.

During the subsequent discharging of the cell sodium ions are re-inserted into the active material. The re-insertion process corresponds to 31 mAh/g; this indicates the reversibility of the sodium ion extraction-insertion processes.

Figure 11B:
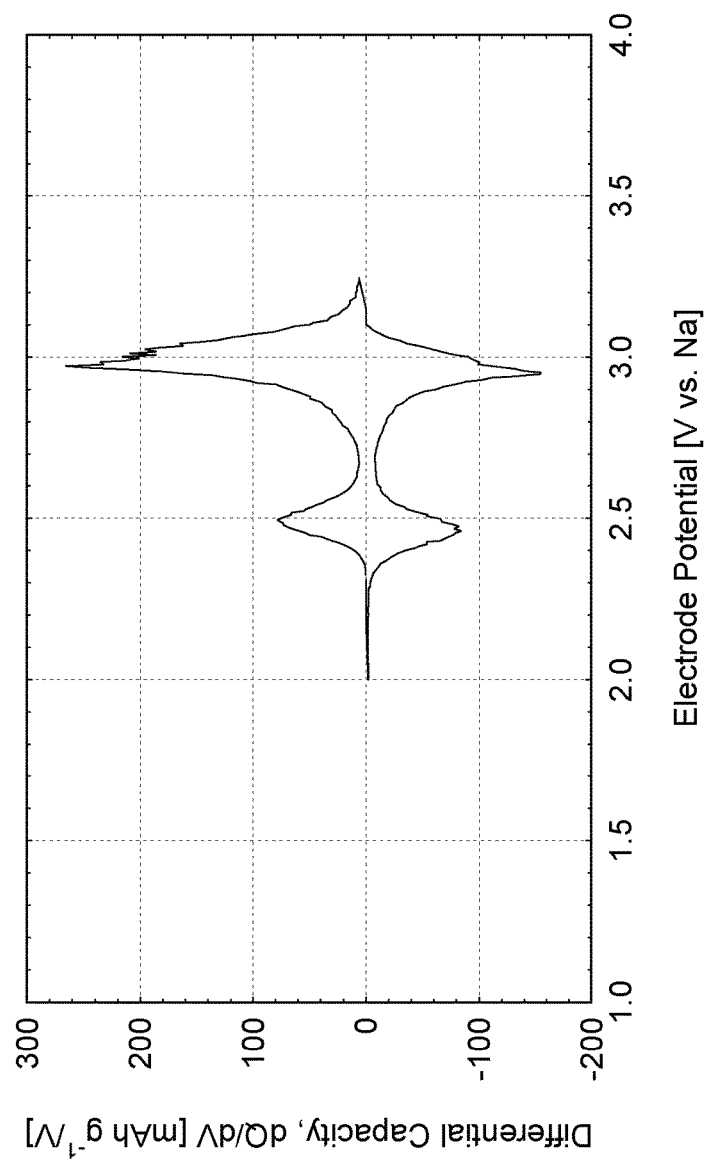
FIG. 11b shows the Differential capacity profile of $Na_{2.5}V_{0.5}Si_2O_6$ (S0195b) in the voltage range 2.00-3.25 V vs. Na in 0.5 M $NaClO_4$ in PC.

FIG. 11b shows the second cycle differential capacity profile (differential capacity versus electrode potential) for the $Na_{2.5}V_{0.5}Si_2O_6$ active material (Sample S0195b). The generally symmetrical nature of the differential capacity peaks shown in FIG. 11b indicates the excellent reversibility of the material.

Examples 1 and 3 (Comparative Examples) for the Preparation of Na₂MnSiQ and the Electrochemical Testing Thereof The current workers have synthesised Na2MnSiO4 by solid state (Example 1) and sol-gel methods (Example 3), both with and without added carbon. The carbon was introduced into the active material composition during the synthesis step to try and improve the electronic conductivity of the material. The sol-gel method was used to try and reduce the particle size. Small particle sizes and carbon coating is known by those skilled in the art to aid the performance of highly resistive active materials.

Figure 12:
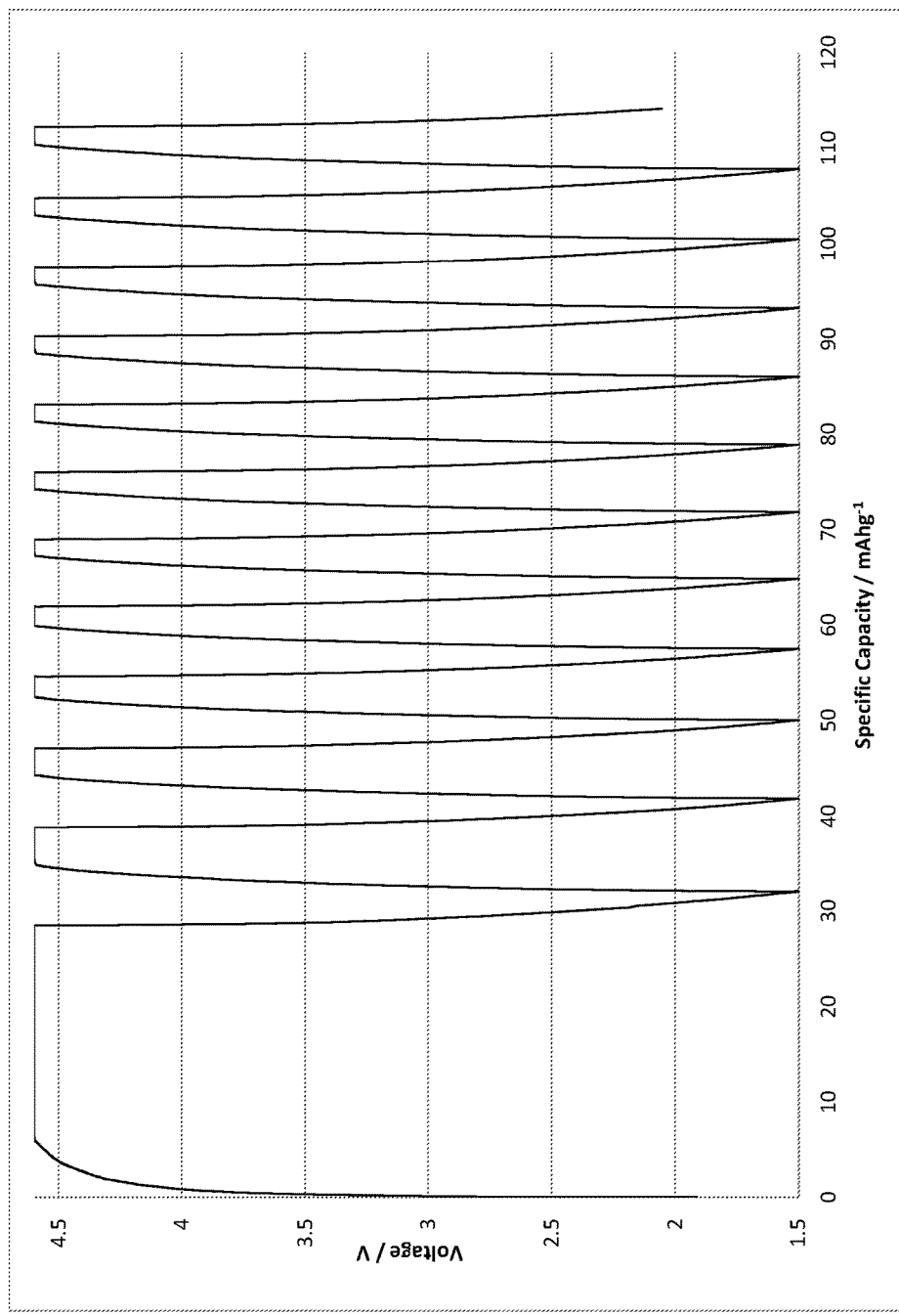
FIG. 12 shows the constant current constant voltage cycling, in the voltage range 1.5-4.6V, 5 $mAg^{-1}$ charge and discharge rate, for $Na_2MnSiO_4$ prepared according to Example 1 (comparative).
Figure 13:
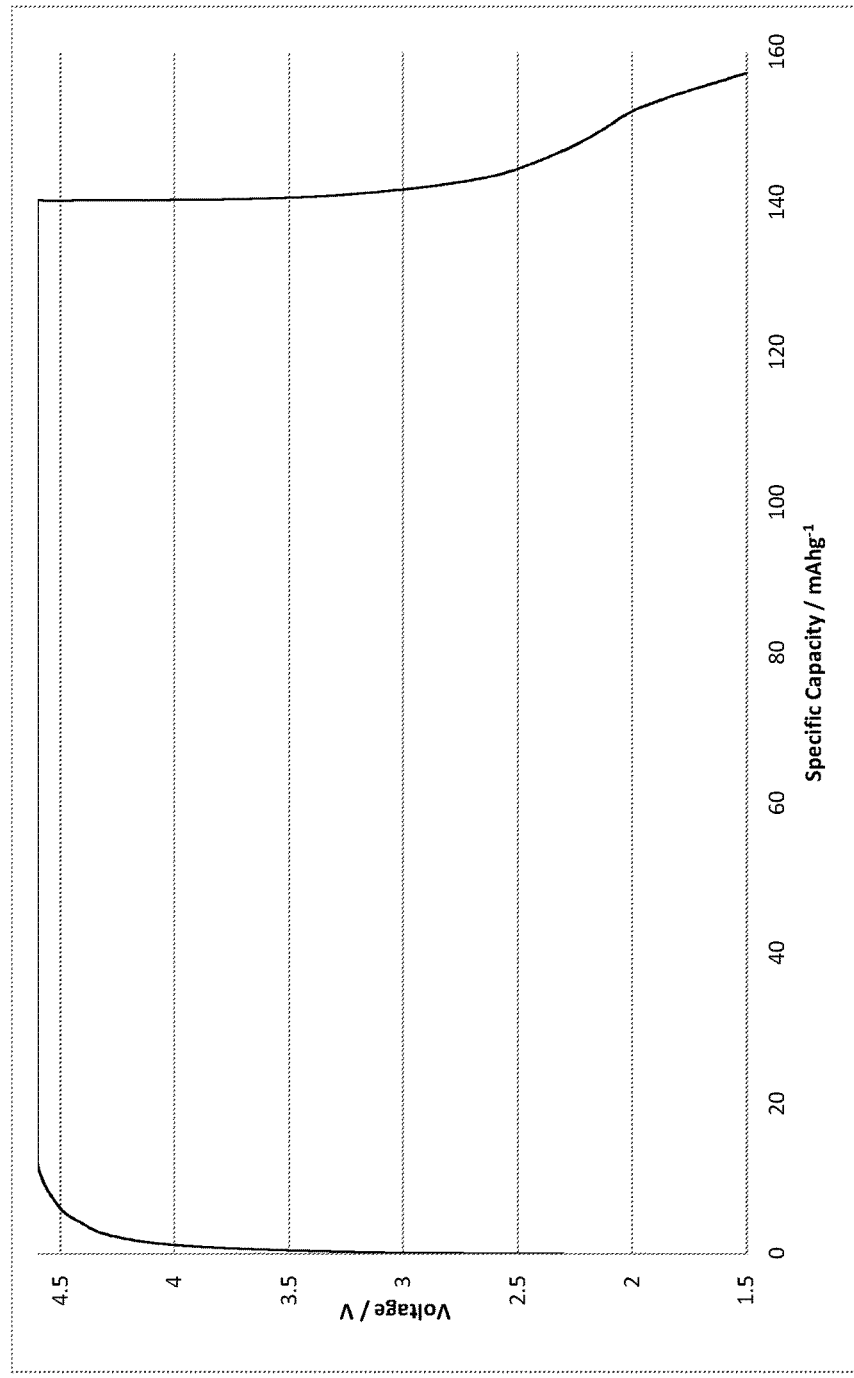
FIG. 13 shows the constant current 5 mA/g, constant voltage cycling, in the voltage range 1.5-4.6V for $Na_2MnSiO_4$ prepared according to Example 3 (comparative).

As illustrated in FIG. 12, carbon-coated Na2MnSiO4 material made by a solid state process (Example 1) is found to have an extremely low initial charge capacity (around 32 mAhg⁻¹) and poor reversible capacities (generally less than 10 mAhg⁻¹). The material made by the sol-gel method (Example 3) showed a slightly higher initial charge capacity (around 56 mAhg⁻¹), see FIG. 13 compared against FIG. 12, but the reversibility of the material was still very low at less than 15 mAhg⁻¹. These findings are extremely surprising in the light of the excellent reversibility results obtained for the compounds of the present invention discussed above.

Electrodes according to the present invention are suitable for use in many different applications, energy storage devices, rechargeable batteries, electrochemical devices and electrochromic devices. Advantageously the electrodes according to the invention are used in conjunction with a counter electrode and one or more electrolyte materials.

The electrolyte materials may be any conventional or known materials and may comprise of either aqueous electrolyte or non-aqueous electrolytes or a mixture thereof.

The invention claimed is:

1. A cathode electrode comprising a conductive material and one or more sodium-containing transition metal silicate compounds of the formula:

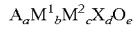

wherein

A comprises sodium, or a mixture of sodium with lithium and/or potassium, where sodium is present as the major alkali metal component, wherein when c>0 then M¹ comprises one or more transition metals;

or wherein when c=0 then

M¹ comprises two or more transition metals, wherein M¹ is capable of undergoing oxidation to a higher oxidation state, M² comprises one or more non-transition metals and/or metalloids, X comprises at least 40 mol % silicon, a is >0, b is >0 d is ≥1, e is ≥2, wherein the values of a, b, c, d, and e are selected to maintain the electroneutrality of the compound.

2. The electrode according to claim 1 wherein when c>0 then M¹ comprises one or more transition metals selected from titanium, vanadium, chromium, manganese, iron, cobalt, nickel, copper, yttrium, zirconium, niobium, molybdenum, rhodium, palladium, silver, cadmium, hafnium, tantalum, tungsten, osmium, platinum and gold; or wherein when c=0 then either M¹ comprises one transition metal selected from titanium, vanadium, chromium, cobalt, nickel, copper, yttrium, zirconium, niobium, molybdenum, rhodium, palladium, silver, cadmium, hafnium, tantalum, tungsten, osmium, platinum and gold, or M¹ comprises two or more transition metals selected from titanium, vanadium, chromium, manganese, iron, cobalt, nickel, copper, yttrium, zirconium, niobium, molybdenum, rhodium, palladium, silver, cadmium, hafnium, tantalum, tungsten, osmium, platinum and gold.

3. The electrode according to claim 1 wherein when c>0 then M¹ comprises one or more transition metals selected from iron, cobalt, manganese, nickel, chromium and vanadium; or wherein when c=0 then either M¹ comprises one transition metal selected from cobalt, nickel, chromium and vanadium, or M¹ comprises two or more transition metals selected from iron, cobalt, manganese, nickel, chromium and vanadium.

4. The electrode according to claim 1 wherein the amount of M¹ is in the range 0<b≤5.

5. The electrode according to claim 1 wherein M² comprises one or more non-transition metals and/or metalloids selected from magnesium, zinc, calcium, beryllium, strontium, barium, aluminum and boron.

6. The electrode according to claim 1 wherein the amount of M² is in the range 0≤c<1.

7. The electrode according to claim 1 wherein the $X_dO_e$ comprises a silicate group selected from $Si_2O_6$, $Si_2O_7$, $Si_2O_8$, $Si_8O_{24}$ and $Si_3O_{12}$.

8. An energy storage device comprising the electrode according to claim 1.

9. The energy storage device according to claim 8 suitable for use as one or more of the following: a sodium and/or lithium and/or potassium ion cell; a sodium metal and/or lithium metal and/or potassium metal ion cell; non-aqueous electrolyte sodium ion and/or lithium ion and/or potassium ion cell, an aqueous electrolyte sodium ion and/or lithium ion and/or potassium ion cell.

10. A rechargeable battery comprising the electrode according to claim 1.

11. Use of the electrode according to claim 1 in an electrical energy storage device.

12. The electrode according to claim 1, wherein the conductive material comprises carbon.

13. The electrode according to claim 1 wherein the $X_dO_e$ comprises a silicate group selected from $Si_2O_7$, $Si_2O_8$, $Si_8O_{24}$, and $Si_3O_{12}$.

* * * * *